J. F. SWARENS.
AIR FILTER FOR AUTOMATIC ENGINES.
APPLICATION FILED MAY 22, 1919.

1,339,726. Patented May 11, 1920.

Inventor:
John F. Swarens,
by Spear, Middleton, Donaldson & Hall
Attys.

UNITED STATES PATENT OFFICE.

JOHN F. SWARENS, OF KANSAS CITY, MISSOURI.

AIR-FILTER FOR AUTOMATIC ENGINES.

1,339,726.  Specification of Letters Patent.  Patented May 11, 1920.

Application filed May 22, 1919. Serial No. 298,869.

*To all whom it may concern:*

Be it known that I, JOHN F. SWARENS, a citizen of the United States, and resident of Kansas City, Missouri, have invented certain new and useful Improvements in Air-Filters for Automatic Engines, of which the following is a specification.

This invention relates to means for filtering the air supplied to the carbureter of an automobile engine and it is susceptible of use with stationary gas engines as well as those employed for automobiles, tractors, trucks and the like.

In carrying out the invention I aim to provide a filter which will need practically no attention on the part of the user, it being so organized as to be self-cleaning. The filter is of the dry type not employing liquid as a filtering medium.

As is well known to automobilists considerable trouble is experienced by reason of dust, grit and foreign matter passing through the carbureter with the air and creating trouble in the cylinder of the engine and causing wear of the parts and to eliminate the passage of dust and foreign matter into the engine or other parts of the system, I employ a filter through which the air passes on its way to the carbureter.

In the accompanying drawings.

Figure 1:
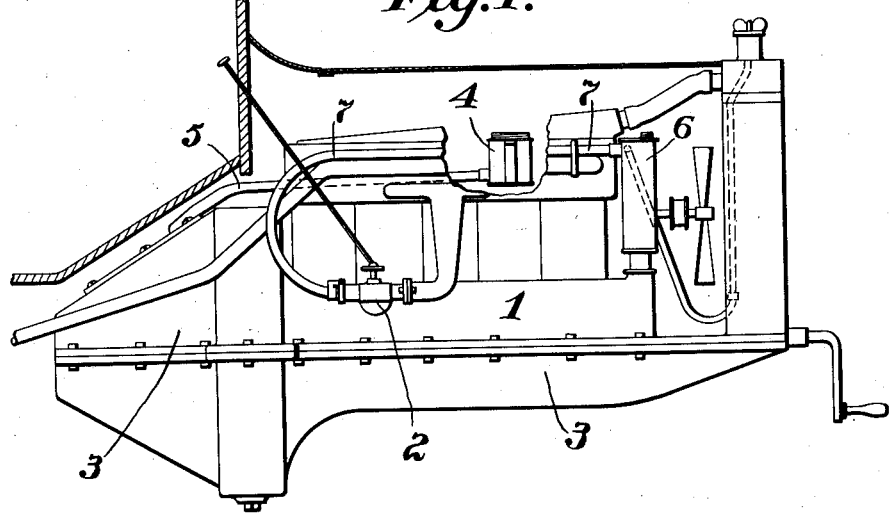
Figure 1 is a view of an automobile engine with carbureter attached and with the air filter in place.

In these drawings 1 indicates a gas engine adapted for automobile use of any suitable type. The carbureter is indicated generally at 2. The crank case at 3. 4 indicates the air filter and in Fig. 1 this is shown as connected by a pipe 5 to the crank case 3. To this crank case is connected a baffle or gas filter chamber 6 and this in turn is connected by a pipe 7 to the carbureter 2. The air taken in through the air filter first passes to the crank case and in its passage therethrough takes up any gas or vapor which may exist in the crank case and after passing through the baffle chamber 6 the air mixed with this gas passes to the carbureter and thence through the manifold to the engine.

The air filter comprises a chamber 8 having within it a packing of elastic hair. This hair is not packed tightly but it is arranged to provide for some vibration of its strands and to leave sufficient spaces or interstices for the passage of the air. The packing is held within the casing by a lower screen member 9 having a comparatively large mesh for the passage of the air and the packing is held at the top by a second screen member 10, also having a comparatively large mesh above which may be located a fine gauze or other screen 11, and above this may be arranged a second gauze or other fine screen 12. These gauze screens may be held in place by spring rings 13. Instead of the upper gauze screen a sponge may be employed and this may be dampened, if desired, to catch the impurities. The inner chamber in which the hair packing is located is surrounded by an outer casing 14 spaced apart therefrom leaving an annular channel 15 which communicates with the discharge pipe leading to the crank case of the engine. The outer casing is closed by a screw cap 16 and this may be of sufficient diameter to enable ready access to the screening material and the hair packing and to the sponge so that these parts can be placed in position or after the device has been used for some time access can be had for renewing or cleaning the sponge and the upper gauze screen members. The lower opening through which the air enters the filter is substantially of the full diameter of the chamber containing the hair packing. The vibration due to running of the engine and more especially the vibrations due to running over the road will keep the strands of the hair packing more or less in movement or vibration, the effect being to dislodge any particles of grit or dirt which may be caught by the hair packing and thus the device will be self-cleaning, the lower screen member being, as stated, of large mesh and of the full diameter of the mass of hair packing so that the dislodged particles of dirt or grit may fall away through the lower opening. After long continued use it may be desirable to renew the upper screen member or members and this can be readily done by removing the screw cap.

Figure 3:
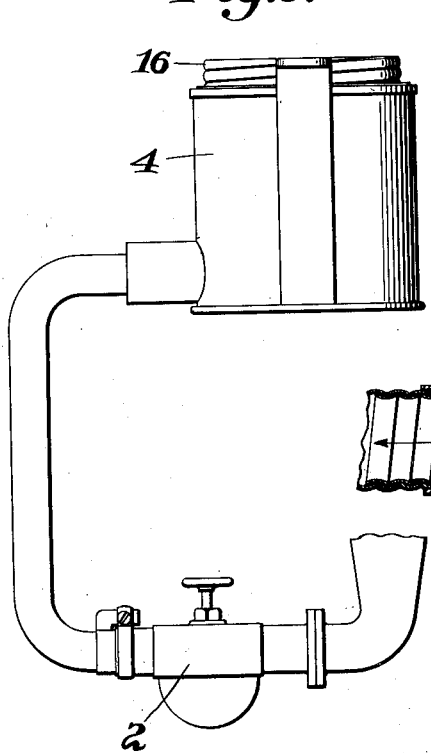
Fig. 3 is a detailed view of a modification in which the air filter is more directly connected with the carbureter than is the case in Fig. 1.
Figure 2:
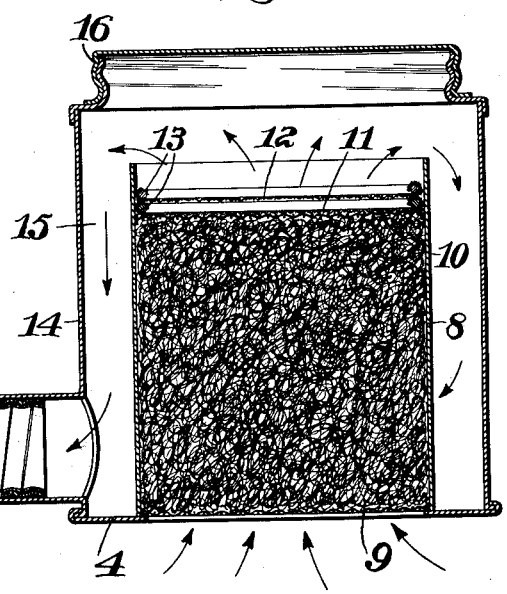
Fig. 2 is a detailed sectional view of the air filter.

Instead of connecting the filter with the crank case of the engine so that the air passes through the crank case and takes up any gas or vapor which may exist therein, I may connect the air filter directly to the carbureter, as shown in Fig. 3. The vibration of the mass of hair packing will also serve to dislodge accumulations from the under sides of the upper screen by the movement of the strands of the packing against this under surface.

The air pipes may be led close to the exhaust manifold of the carbureter so as to derive heat therefrom thus supplying heated purified air to the carbureter.

I claim as my invention:

1. An air filter for automobile engines comprising an outer casing, an inner casing arranged centrally of the outer casing with a space between the walls of said casings closed at the bottom, said casings being arranged with their axis substantially vertical, the inner casing having a lower opening facing downwardly direct to the atmosphere and being open at its top into the outer casing, packing in the inner casing composed of strands of dry hair adapted to vibrate to dislodge collected dust particles, said packing being immediately above the lower inlet opening, screen material at the top and bottom of the hair packing, and an outlet from the outer casing of smaller diameter than the inlet to the inner casing, said outlet leading from the lower part of the space between the inner and outer casing, substantially as described.

2. An air filter for automobile engines comprising a casing having at its lower end an inlet opening for the air facing downwardly direct to the atmosphere, packing in said casing composed of strands of dry hair adapted to vibrate to dislodge collected dust particles, said packing being immediately above the said inlet opening, and an outlet for the filtered air of smaller diameter than the inlet, substantially as described.

In testimony whereof, I affix my signature.

JOHN F. SWARENS.